United States Patent
Sakamoto (10) Patent No.: US 6,601,927 B2
(45) Date of Patent: Aug. 5, 2003

(54) METHOD FOR DETECTING LIFTING OF REAR WHEEL AND METHOD FOR CONTROLLING BRAKING, OF TWO WHEELED VEHICLE

(75) Inventor: Tadashige Sakamoto, Yokosuka (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/974,401

(22) Filed: Oct. 10, 2001

(65) Prior Publication Data

US 2003/0066720 A1 Apr. 10, 2003

(51) Int. Cl.$^7$ ................................. B60T 8/32
(52) U.S. Cl. ..................... 303/137; 303/191; 303/194; 701/70
(58) Field of Search ................. 303/137, 145, 303/150, 149, 191, 194, 195, 196, 198, 159, 169, 139; 188/181 A, 181 C; 701/70, 71, 78

(56) References Cited

U.S. PATENT DOCUMENTS

| | | | | |
|---|---|---|---|---|
| 4,924,394 A | * | 5/1990 | Uchida et al. | 303/DIG. 5 |
| 5,324,102 A | * | 6/1994 | Roll et al. | 303/137 |
| 5,386,366 A | * | 1/1995 | Roll et al. | 303/137 |
| 5,816,670 A | * | 10/1998 | Yamada et al. | 303/191 |
| 6,062,660 A | * | 5/2000 | Matsuno et al. | 188/181 C |

FOREIGN PATENT DOCUMENTS

| | | |
|---|---|---|
| EP | 0 524 821 A2 | 1/1993 |
| JP | 5-24523 | 2/1993 |

* cited by examiner

*Primary Examiner*—Pam Rodriguez
(74) *Attorney, Agent, or Firm*—Frommer Lawrence & Haug, LLP; Ronald R. Santucci

(57) ABSTRACT

To provide a technique capable of detecting lifting of a rear wheel of a two-wheeled vehicle correctly and rapidly. An estimated vehicle speed is generated by selecting the larger one of wheel speed Vf, Vr of a rear wheel and a front wheel, and attention is paid to an estimated vehicle deceleration which is computed based on the estimated vehicle speed and it is judged that lifting of the rear wheel has occurred when a degree of lowering of the estimated vehicle deceleration is a predetermined value or larger. At the time of an actual judgment, the degree of lowering of the estimated vehicle deceleration is judged to be a predetermined value or larger when one of the following items (A) and (B) is judged to be present; (A) a first condition is satisfied in which the estimated vehicle deceleration is lower than a predetermined value and in addition, a second condition is satisfied in which the first condition is fulfilled for a predetermined time or longer; (B) a third condition is satisfied in which the estimated vehicle deceleration is lower than a predetermined value within a predetermined time.

6 Claims, 8 Drawing Sheets

METHOD FOR DETECTING LIFTING OF REAR WHEEL AND METHOD FOR CONTROLLING BRAKING, OF TWO WHEELED VEHICLE

BACKGROUND OF THE INVENTION

1. Field of the Invention

This invention relates to a technique for detecting a rear wheel lifting phenomenon in which a rear wheel lifts from a ground surface, and to a technique for controlling a brake based on the detection, in a two-wheeled vehicle which is equipped with an antilock brake control unit (later referred to as an ABS-unit).

2. Related Art

A rear wheel lifting of this type is liable to occur especially in two-wheeled vehicles. Among all types of two-wheeled vehicles, the rear wheel lifting more easily occurs, in those two-wheeled vehicles in which a ratio between a height of center of gravity and a distance from a front wheel to a rear wheel, is larger. For example, if a front wheel should be braked in a two-wheeled vehicle having such a large ratio while the vehicle is running on a road surface having a large slip friction coefficient (so called high $\mu$), a rear wheel would be easily lifted in air. It is desired to properly control the braking with respect, for example, to a front wheel by detecting a rear wheel lifting in order to ensure running-stability of the vehicle.

In a case where a two-wheeled vehicle having a large ratio between a height of center of gravity and a distance from a front wheel to a rear wheel, is equipped with an ABS-unit, the rear wheel lifting possibly causes the braking control to be deteriorated. For example, when a rear wheel lifting occurs (in the lifting state, a ground load of the rear wheel becomes zero), the ABS-unit becomes difficult to receive feedback information from the road surface, the computation of an estimated vehicle control speed in the ABS-unit is jeopardized and the braking is deteriorated.

The idea itself for detecting a rear wheel lifting in a two-wheeled vehicle and a brake controlling is conducted in accordance with the detection, is known as disclosed, for example, in Japanese Patent Application Laid-Open Publication No. H05-24523 (corresponding to European Patent No. 524821 A2). This Publication teaches a technique in which the lowering of a rear wheel ground load is detected by monitoring changes in wheel speed at the rear wheel (namely, wheel acceleration and deceleration at the rear wheel) of a two-wheeled vehicle. It is difficult, however, to correctly detect the lowering of the ground load based on the wheel acceleration and deceleration at the rear wheel, if it is taken into account that the wheel acceleration and deceleration at the rear wheel becomes a positive/negative value in accordance with the wheel controlling cycle when the ABS-unit is being antilock controlled and that the state of a road surface changes. In order to prevent erroneous detection, it is necessary to take a longer timer setting time. This causes to lower the sensitivity in detection.

SUMMARY OF THE INVENTION

[Objects of the Invention]

It is, therefore, a problem to be solved or first object of the present invention to provide a technique capable of detecting lifting of a rear wheel in a two-wheeled vehicle correctly and rapidly.

Another object of the present invention is to provide a brake controlling technique capable of conducting a proper brake controlling operation by rectifying an estimated vehicle speed in antilock brake controlling operation based on detection of a rear wheel lifting.

[Means for Solving the Problems]

The inventor of the present invention has carried out running tests of two-wheeled vehicles under many different conditions and made extensive study on the results. Consequently, he has noticed that when a rear wheel lifting occurs, significant changes are taken place in which deceleration in estimated vehicle speed obtained by computation based on a so-called select high, is abruptly decelerated. In the present invention, attention is paid to changes in estimated vehicle deceleration and the rear wheel lifting phenomenon in a two-wheeled vehicle is detected by utilizing such changes. In comparison with the conventional detection technique, the detection technique according to the present invention is a technique for monitoring the degree of estimated vehicle deceleration representing a state of the vehicle, while the conventional one is a technique for monitoring wheel acceleration and deceleration representing a state of the wheel. When a two-wheeled vehicle running on a high $\mu$ road surface is fully braked, the estimated vehicle deceleration is originally at a level representing a high degree of deceleration and relatively stabilized. However, the degree of wheel acceleration and deceleration is changeable depending on motion of the wheel, and it changes when the antilock controlling operation is conducted, irrespective of the state of the road surface and the state of the vehicle. For this reason, from the view point of timer-setting short in order to avoid erroneous detection, the detection technique according to the present invention can be said to be superior to the conventional one.

In a technique for detecting lifting of a rear wheel according to the present invention, an estimated vehicle speed is generated by selecting the larger one of wheel speed of a front wheel and a rear wheel at the time of detecting lifting of the rear wheel from a ground surface, and attention is paid to an estimated vehicle deceleration which is computed based on the estimated vehicle speed and it is judged that lifting of the rear wheel has occurred when a degree of lowering of the estimated vehicle deceleration is a predetermined value or larger. At the time of an actual judgment, the degree of lowering of the estimated vehicle deceleration can be judged as a predetermined value or larger when one of the following items A and B is judged to be present;

A. A first condition is satisfied in which the estimated vehicle deceleration is lowered than a predetermined value and in addition, a second condition is satisfied in which the first condition is fulfilled for a predetermined time or longer.

B. A third condition is satisfied in which the estimated vehicle deceleration is lowered than a predetermined value within a predetermined time.

With respect to the item A, the first condition about changes in estimated vehicle deceleration is the condition which is based on the finding of the inventor of the present invention, and the second condition about continuation of time is a condition corresponding to the previously-mentioned timer setting time. The item B relates to a method for setting conditions without using a timer, in which an average value of changed amounts is set by a so-called time window and the average value is monitored. Since the item B is eased in conditions for continuation of time compared with the item A, lifting of the rear wheel can more easily be detected. Although both methods of the items A and B can effectively be applied to two-wheeled vehicles of the type in which resistance is small about an axle of a rear wheel as a driven wheel, the method of the item B is more preferable than the method of the item A with respect to two-wheeled vehicles of the type in which resistance is large about an axle of a rear wheel.

For example, in two-wheeled vehicles of the type in which resistance is relatively large about an axle of a driven wheel, it sometimes occurs that the second condition under the item A becomes unable to be satisfied because the vehicle speed is slightly reduced due to resistance of a driving system of a rear wheel which is lifted, when this occurs, in air. In this respect, since the degree of vehicle deceleration is monitored as an average value in the item B, the rear wheel lifting can more easily be detected.

On the other hand, in a technique for controlling a brake according to the present invention, rear wheel lifting is detected by detection technique utilizing changes in estimated vehicle deceleration, and a deceleration gradient of the estimated vehicle speed used for the ABS-unit is limited to be small based on the detection of lifting of the rear wheel. Moreover, preferably, by computation of the estimated vehicle speed based either on the front wheel speed or on a lowest wheel speed (so-called select low) at the time of detection of lifting of the rear wheel, the estimated vehicle speed is eventually made compliant with the wheel speed of the front wheel.

DETAILED DESCRIPTION OF THE INVENTION

[Change Examples of Estimated Vehicle Deceleration Observed in Running Test]

FIGS. 1 to 4 are typical examples showing how an estimated vehicle speed and an estimated vehicle deceleration change when a two-wheeled vehicle is braked on a high $\mu$ road surface. In the illustrated examples, time is plotted along the abscissa, and estimated vehicle speed and estimated vehicle deceleration are plotted along the ordinate. In the respective illustrations, data at the time of braking only a front wheel are shown. It should be noted, however, the illustrated data are likewise applicable when both front and rear wheels are braked.

Figure 1:
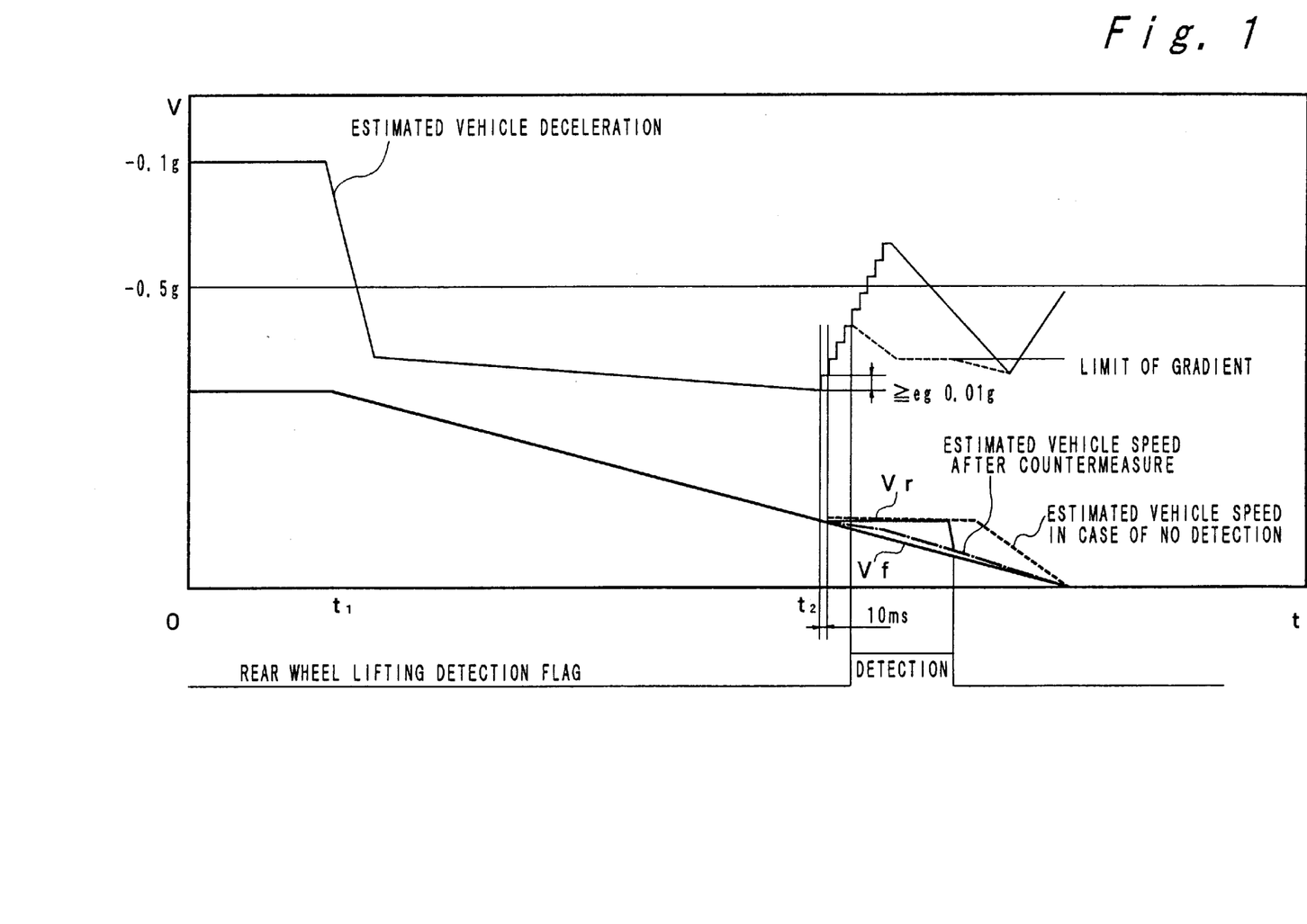
FIG. 1 is a first change example of estimated vehicle deceleration observed in running test and is a characteristic diagram on a basis of which the present invention is made.

FIG. 1 clearly shows the abrupt deceleration in estimated vehicle deceleration which can be observed at the time of lifting of the rear wheel. In response to the braking of the front wheel at the time $t_1$, the estimated vehicle speed is gradually lowered. On the other hand, the estimated vehicle deceleration is abruptly raised immediately after the time $t_1$ and thereafter, it is gently changed. During such gentle variation, the estimated vehicle deceleration is abruptly dropped at the time $t_2$. Lifting of the rear wheel occurs at the time of this abrupt deceleration.

Figure 2:
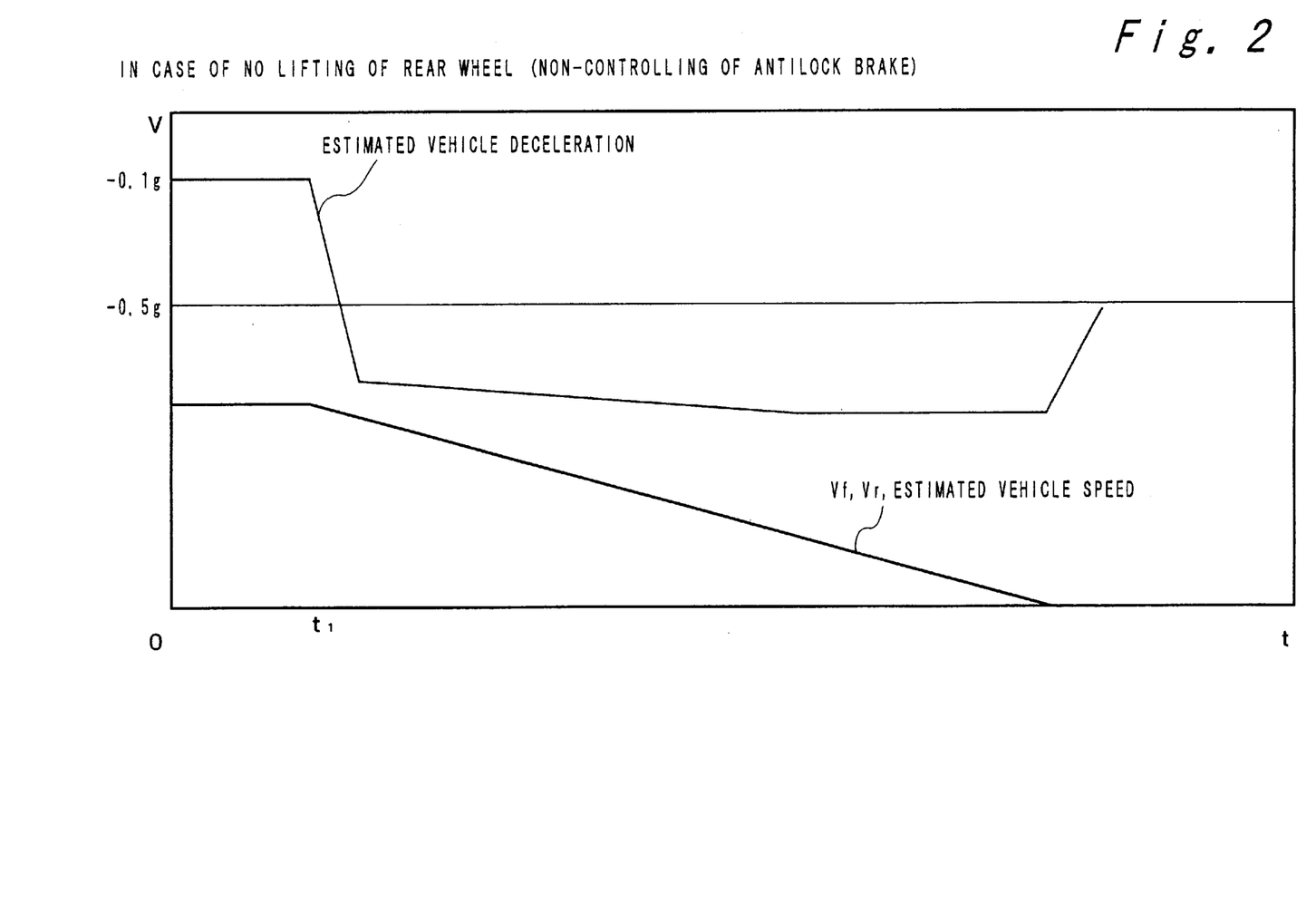
FIG. 2 is a characteristic diagram showing a second change example of estimated vehicle deceleration observed in running test.

FIG. 2 shows an example in which no lifting of the rear wheel occurs. In response to the braking of the front wheel at the time $t_1$, the estimated vehicle speed is gradually lowered. On the other hand, the estimated vehicle deceleration is abruptly raised immediately after the time $t_1$ and thereafter, it is gently changed. During the gentle variation, no lifting of the rear wheel occurs. Such abrupt deceleration in estimated vehicle deceleration as in FIG. 1 is not observed. FIG. 2 shows an example in which the controlling of the antilock brake is not performed.

Figure 3:
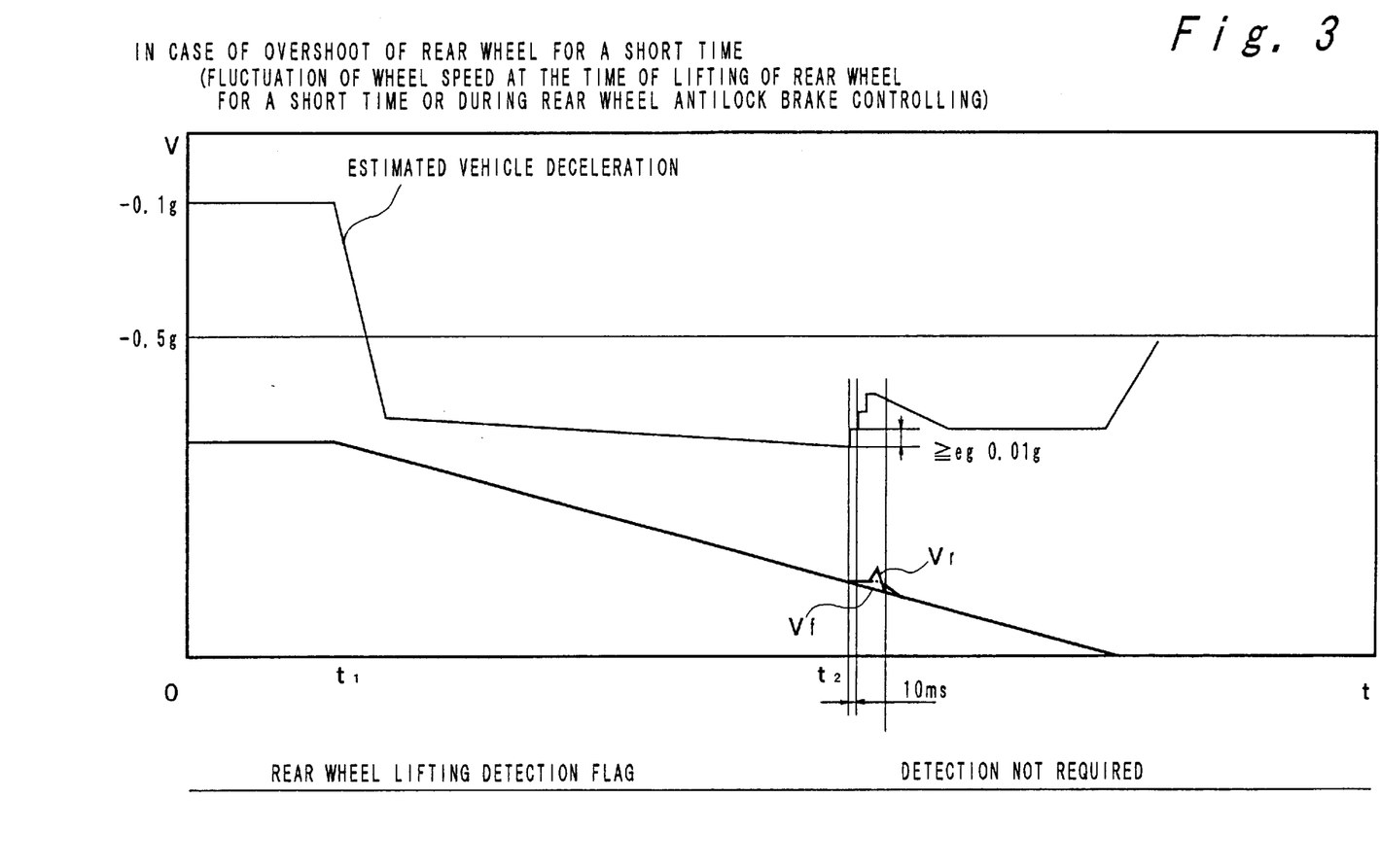
FIG. 3 is a characteristic diagram showing a third change example of estimated vehicle deceleration observed in running test.

FIG. 3 shows changes observed at the time of overshooting of the rear wheel speed which occurs only for a short time. In response to the braking of the front wheel at the time $t_1$, the estimated vehicle speed is gradually lowered. On the other hand, the estimated vehicle deceleration is abruptly raised immediately after the time $t_1$, and thereafter, it changes gently. During such gentle change, the rear wheel lifts for a short time at the time $t_3$, or overshooting of the rear wheel speed occurs for a short time caused by fluctuation of the vehicle speed during the controlling of the antilock brake. Such overshooting of the rear wheel speed which occurs only for a short time, is not an object, namely, lifting of the rear wheel, to be detected.

Figure 4:
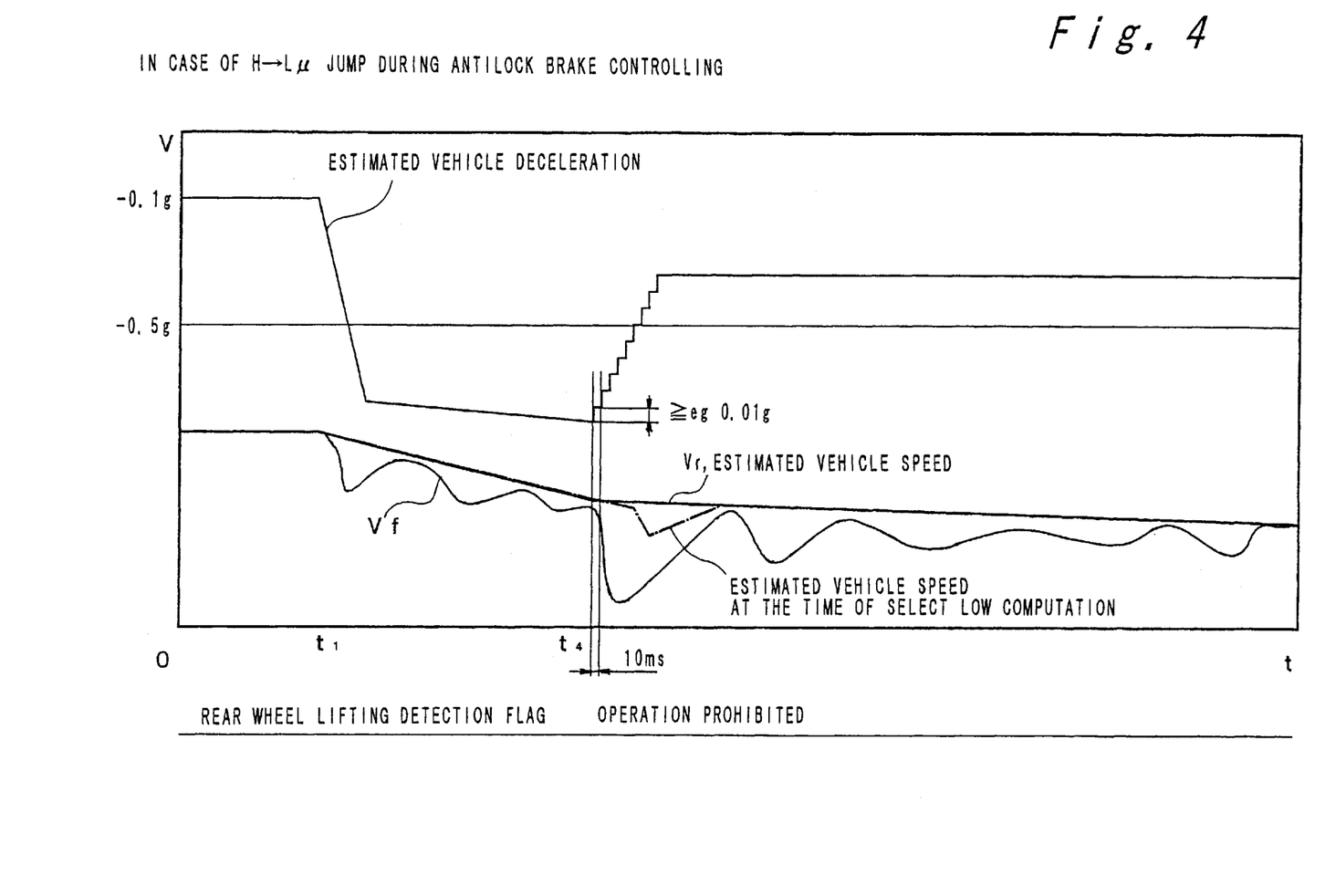
FIG. 4 is a characteristic diagram showing a fourth change example of estimated vehicle deceleration observed in running test.

FIG. 4 shows changes when the two-wheeled vehicle comes from a high $\mu$ such as the asphalt to the road surface of low $\mu$ such as ice (in the case of so-called $\mu$ jump or H-L $\mu$ jump) during the controlling of the antilock brake. In response to the braking of the front wheel at the time $t_1$, the estimated vehicle speed is gradually lowered. On the other hand, the estimated vehicle deceleration is immediately raised after the time $t_1$ and thereafter, it is gradually changed. During such gentle change, there is a $\mu$ jump at the time $t_4$ where an abrupt drop or lowering of the estimated vehicle deceleration resembling that of FIG. 1, can be observed. However, this is not the object, namely, lifting of the rear wheel, which is to be detected according to the present invention, either. If this should be detected as lifting of the rear wheel and if the estimated vehicle speed should be computed in select-low mode based on it, the performance of the controlling of the antilock brake would possibly be deteriorated.

From the results of the running tests mentioned above, it will be understood that a judgment of an occurrence of lifting of the rear wheel can be made basically when a phenomenon of abrupt lowering of the estimated vehicle deceleration (phenomenon in which the estimated vehicle deceleration shows changes, for example, +0.01 g or more at every 10 ms, wherein ms is an abbreviation of msec which means $\frac{1}{1000}$ seconds) is continued for a predetermined time (for example, 40 ms) or more, it will also be understood that the conditions to be stated hereinafter are preferably added in order to more positively avoid an erroneous detection. The first of the additive conditions is to prevent an erroneous detection resulting from H-L $\mu$ jump. As a condition therefor, the fact(s) can be employed in which the wheel speed of the front wheel is abruptly decelerated and/or deceleration time of the front wheel is larger than a predetermined value. The second of the additive conditions is that the two-wheeled vehicle is running. As a condition therefor, a fact can be employed in which, for example, the estimated vehicle speed exceeds 2.75 km/h. By this, the detection of lifting of the rear wheel is canceled when the two-wheeled vehicle stops. The third of the additive conditions is that the estimated vehicle deceleration is larger than a predetermined value, for example, 0.5 g (in case the deceleration is represented by minus reference numeral as in the drawings, smaller than −0.5 g). By this, the level of the estimated vehicle deceleration is confirmed. The fourth of the additive conditions is that the wheel speed Vr of the rear wheel is larger than the wheel speed Vf of the front wheel. By this, an erroneous detection is prevented during slipping of the wheel. The fifth of the additive conditions is that the wheel acceleration and deceleration of the rear wheel is a predetermined value (for example, −0.3 g) or larger. This is a condition for confirming an occurrence of one phenomenon attributable to lifting of the rear wheel.

[One Example of Brake Unit to Which the Present Invention is Applied]

Figure 5:
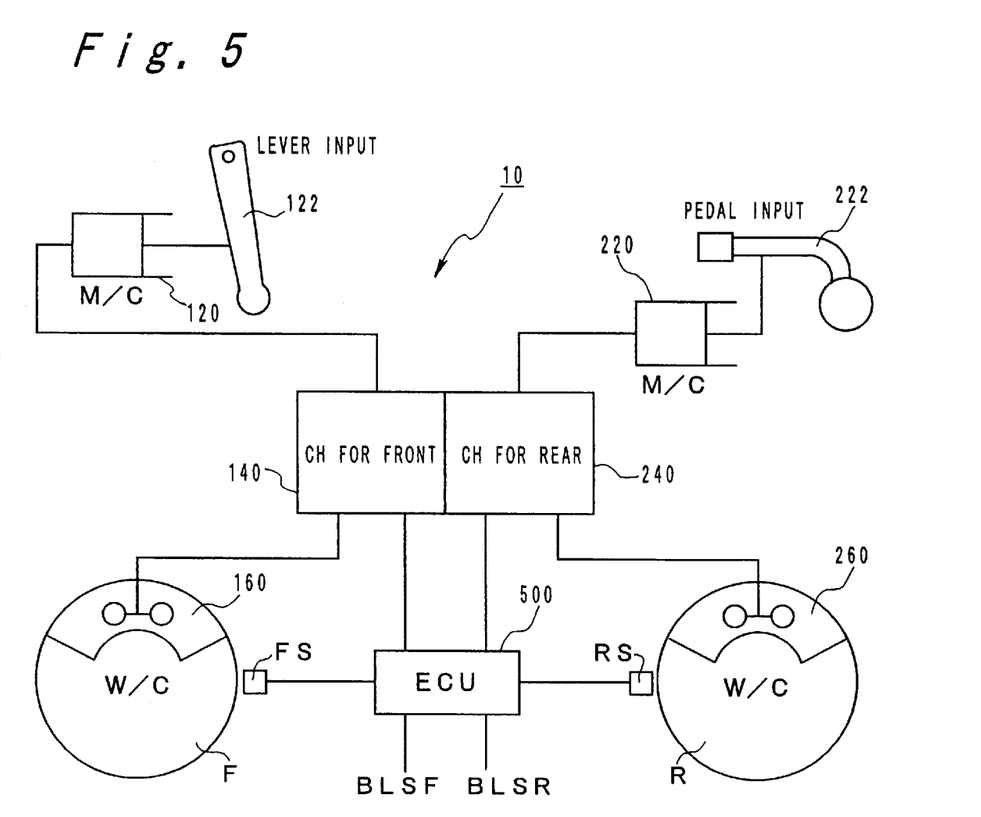
FIG. 5 is a view showing an overall construction of a brake system with which a two-wheeled vehicle is equipped.
Figure 6:
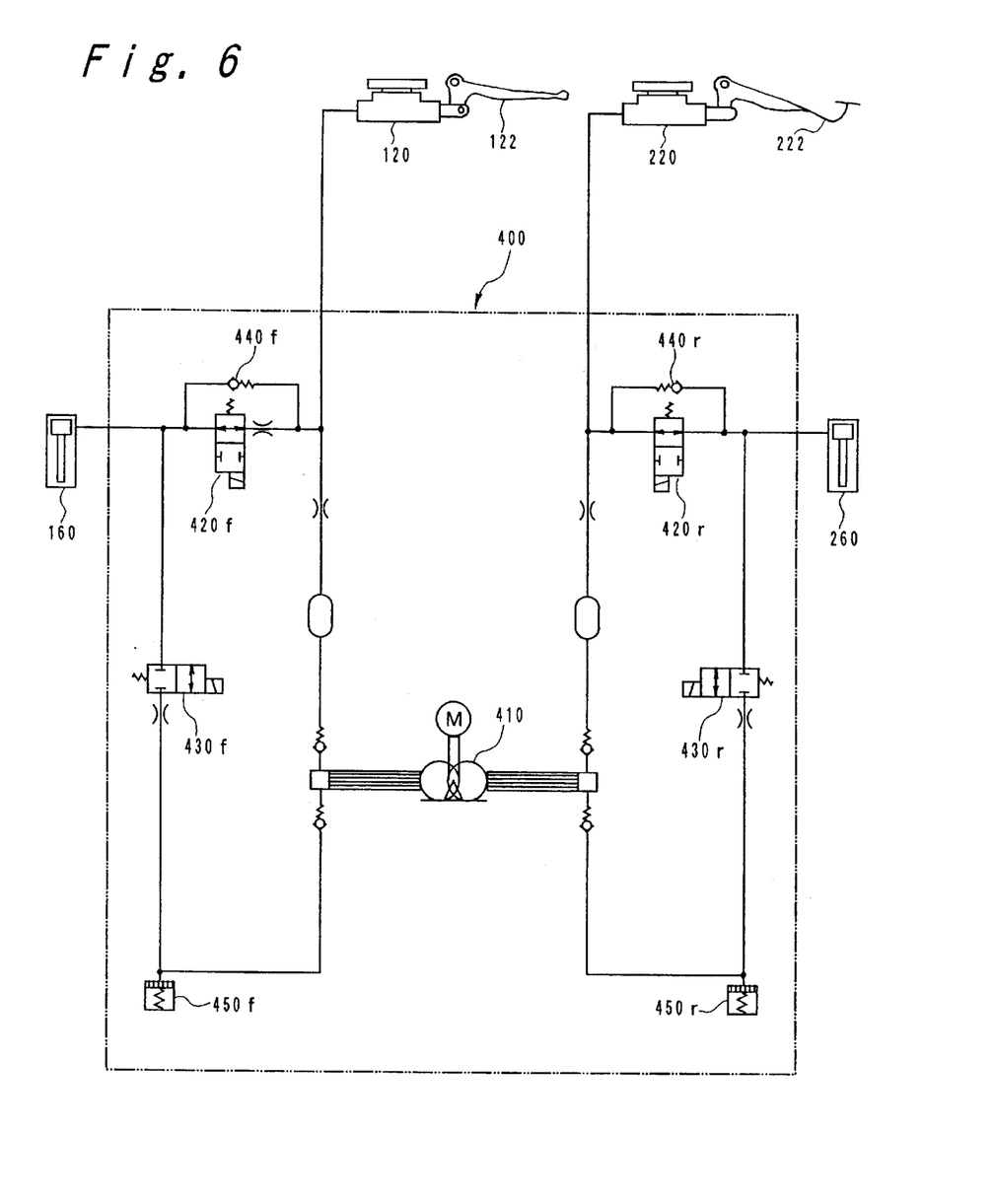
FIG. 6 is a hydraulic circuit diagram showing a piping system of an ABS-unit which the system of FIG. 5 includes.

FIG. 5 is a view showing an overall construction of a brake system with which a two-wheeled vehicle in equipped. FIG. 6 is a hydraulic circuit diagram showing a piping system of an ABS-unit which the system of FIG. 5 includes.

In the two-wheeled vehicle, the front and rear wheels can be separately braked. For that purpose, an illustrated brake system 10 comprises two master cylinders as sources for generating a hydraulic pressure, one is a master cylinder 120 for front and the other is a master cylinder 220 for rear. The front master cylinder 120 is actuated by input of a lever 122 located at a handle part of the two-wheeled vehicle, while the rear master cylinder 220 is actuated by stepping on a pedal 222 located below the handle. The liquid or hydraulic pressure from the independent master cylinders 120, 220 is supplied to a wheel cylinder 160 of the front vehicle wheel F and a wheel cylinder 260 of the rear wheel R through a hydraulic pressure control unit for front (CH for front) 140 and a hydraulic pressure control unit for rear (CH for rear), respectively. The front hydraulic pressure control unit 140 and the rear hydraulic pressure control unit 240 located at an intermediate part of the piping are integrated as a hydraulic pressure control unit 400. FIG. 6 clearly shows a specific construction of the hydraulic pressure control unit 400.

The hydraulic pressure control unit 400 is known as constituting a hydraulic pressure circuit of an ABS-unit. The unit 400 includes, besides a twin hydraulic pressure pump 410 driven by a motor, normally open type two-position solenoid valves 420f, 420r, normally closed type two-position solenoid valves 430f, 430r, release valves 440f, 440r, low pressure reservoirs 450f, 450r, and the like. The antilock brake control unit comprises, in addition to the hydraulic pressure control unit 400, wheel speed sensors FS, RS for detecting the front wheel F speed and the rear wheel R speed, and an electronic control unit (ECU) 500 for conducting a computation in response to signals from the vehicle wheel sensors FS, FR and to brake operating signals BLSF, BLSR for the front and rear wheels and sending a control command to the hydraulic pressure control unit 400 based on the results of computation. The ECU 500 has a function of a microcomputer and comprises, besides the CPU, memories such as ROM and RAM, and input/output ports. Upon receipt of signals from the vehicle speed sensors FS, RS through the input port, the ECU 500 thus constructed computes a vehicle speed, speed of rotation of each vehicle wheel and a slip ratio in its inside and sends a control command to the hydraulic pressure control unit 400 through the output port when the slip ratio becomes a predetermined value or larger.

[Preferred Flow for Detecting Lifting of Rear Wheel: Flow No. 1]

Figure 7:
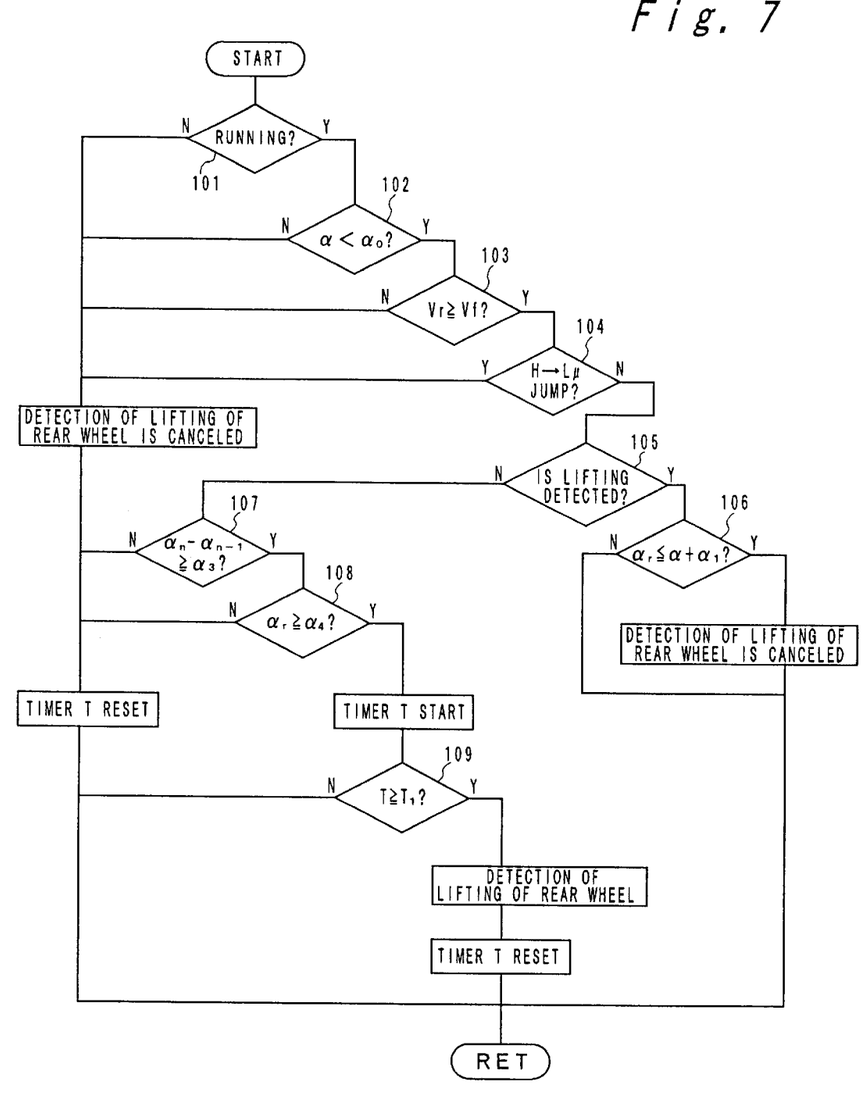
FIG. 7 is a flowchart for detecting lifting of a rear wheel.

The previously mentioned detection of lifting of the rear wheel is conducted here by utilizing the function of the electronic control unit (ECU) 500 which the two-wheeled vehicle is originally equipped. FIG. 7 is a flowchart for detecting lifting of the rear wheel.

First, in Step 101, it is judged whether or not the two-wheeled vehicle (as a vehicle) is in a running condition. If the estimated vehicle speed (computed value based on select high) computed by the ECU 500 does not exceed, for example, 2.75 km/h (lifting of the rear wheel is not likely to occur in this state), it is judged as the vehicle being in a stop condition (N, namely, No) and detection of lifting of the rear wheel is canceled. In contrast, if the estimated vehicle speed exceeds the above value, it is judged as the vehicle being in a running condition (Y, namely, Yes) and the process proceed to the next Step 102. In Step 102, the level of the estimated vehicle deceleration is confirmed based on a judgment as to whether or not the estimated vehicle deceleration a is smaller than a predetermined value α o (for example, −0.5 g). If the level of the estimated vehicle deceleration α is not at that level (it is the case where a judgment is to be made as N and lifting is not likely to occur in this state), detection of lifting of the rear wheel is canceled. In contrast, if the level of the estimated vehicle deceleration is at that level (Y), the next Step 103 is proceeded.

In Step 103, it is judged whether or not the wheel speed Vr of the rear wheel R is larger than the wheel speed Vf of the front wheel F. If lifting of the rear wheel occurs and no braking force is applied to the rear wheel, at least Vr≧Vf is satisfied. If Vr≧Vf is not satisfied (if a judgment is made as N), detection of lifting of the rear wheel is canceled. In contrast, if Vr≧Vf is satisfied (if the judgment is made as Y), the process proceeds to the next Step 104. An erroneous detection caused by slip of the wheel, etc. can be prevented by the procedure in Step 103. In the following Step 104, a judgment is made for the purpose of prevention of erroneous detection attributable to H-L $\mu$ jump. The judgment as to whether or not H-L $\mu$ jump occurs can be judged based on that wheel speed Vf of the front wheel F is abruptly decelerated and/or the decelerating time of the front wheel F is larger than a predetermined time. If it is judged as H-L $\mu$ jump is occurring (Y), detection of lifting of the rear wheel is canceled. In contrast, if it is judged as H-L $\mu$ jump is not occurring (in case of a N judgment), the next Step 105 is proceeded.

Detection of lifting of the rear wheel is conducted at a rate of once, for example, at every 10 ms (wherein ms is an abbreviation of msec which means 1/1000 seconds as previously mentioned). In Step 105, it is judged whether or not detection of lifting of the rear wheel is already made. If the judgment in Step 105 is affirmative (in case of judgement of Y), the Step 106 is proceeded. If the judgment in Step 105 is negative (in case of a judgment of N), the Step 107 is proceeded. In the following Step 106, a judgment is made as to whether or not the rear wheel R is grounded and the wheel acceleration and deceleration $\alpha_r$ is recovered. As a parameter $\alpha_1$ in conjunction with the degree of recovery, for example, 0.2 g can be used. If the judgement is affirmative (in case of a judgment of Y) in Step 106, the detection of lifting of the rear wheel is canceled. In contrast, if the judgment is negative, (in case of a judgment of N), the process returns to the first Step 101.

Step 107 is a step based on a main judging method according to the present invention. In Step 107, it is judged whether or not the estimated vehicle deceleration is abruptly dropped based on the detection conducted at every 10 ms. For that purpose, it is judged whether or not the difference between the this time estimated vehicle deceleration $\alpha_n$ and the preceding time estimated vehicle deceleration $\alpha_{n-1}$ is a predetermined value $\alpha_3$ (for example, −0.01 g) or larger. If the difference is the predetermined value or larger, the next Step 108 is proceeded. In contrast, if the difference is not the predetermined value or larger, a timer T is reset. In Step 108, it is judged whether or not the wheel acceleration and deceleration $\alpha_r$ is flat. For that purpose, it is judged whether or not $\alpha_r$ is a predetermined value $\alpha_4$ (for example, −0.3 g) or larger. This Step 108 is a step for confirming the judgment of the main Step 107. If the judgment of Step 108 is affirmative, the conditions required for the next continuation of time are provided. For that purpose, the timer T is started in accordance to the affirmative judgment in Step 108. In the following Step 109, it is judged whether or not the time counted by the timer T is a predetermined time $T_1$ (for example, 40 ms) or longer. In other words, it is judged whether or not a lifting state of the rear wheel is continued for a predetermined time or longer. If the judgment is affirmative (in case of a judgment of Y) in Step 109, lifting of the rear wheel is detected and a detection flag is set (reference should also be made to FIG. 1). When the detection flag indicative of detection of lifting of the rear wheel is set, the ECU 500 applies a predetermined limit (for example, 0.9 g) to the estimated vehicle deceleration used for controlling the antilock brake and also makes the estimated vehicle speed generated by select high to select low so that the estimated vehicle speed is dependent on the front wheel speed, thereby obtaining a correct estimated vehicle speed (see FIG. 1). In this way, the controlling operation of the antilock brake can be more optimized by rectifying the estimated vehicle speed based on detection of lifting of the rear wheel.

[Preferred Flow for Detecting Lifting of Rear Wheel: Flow No. 2]

Figure 8:
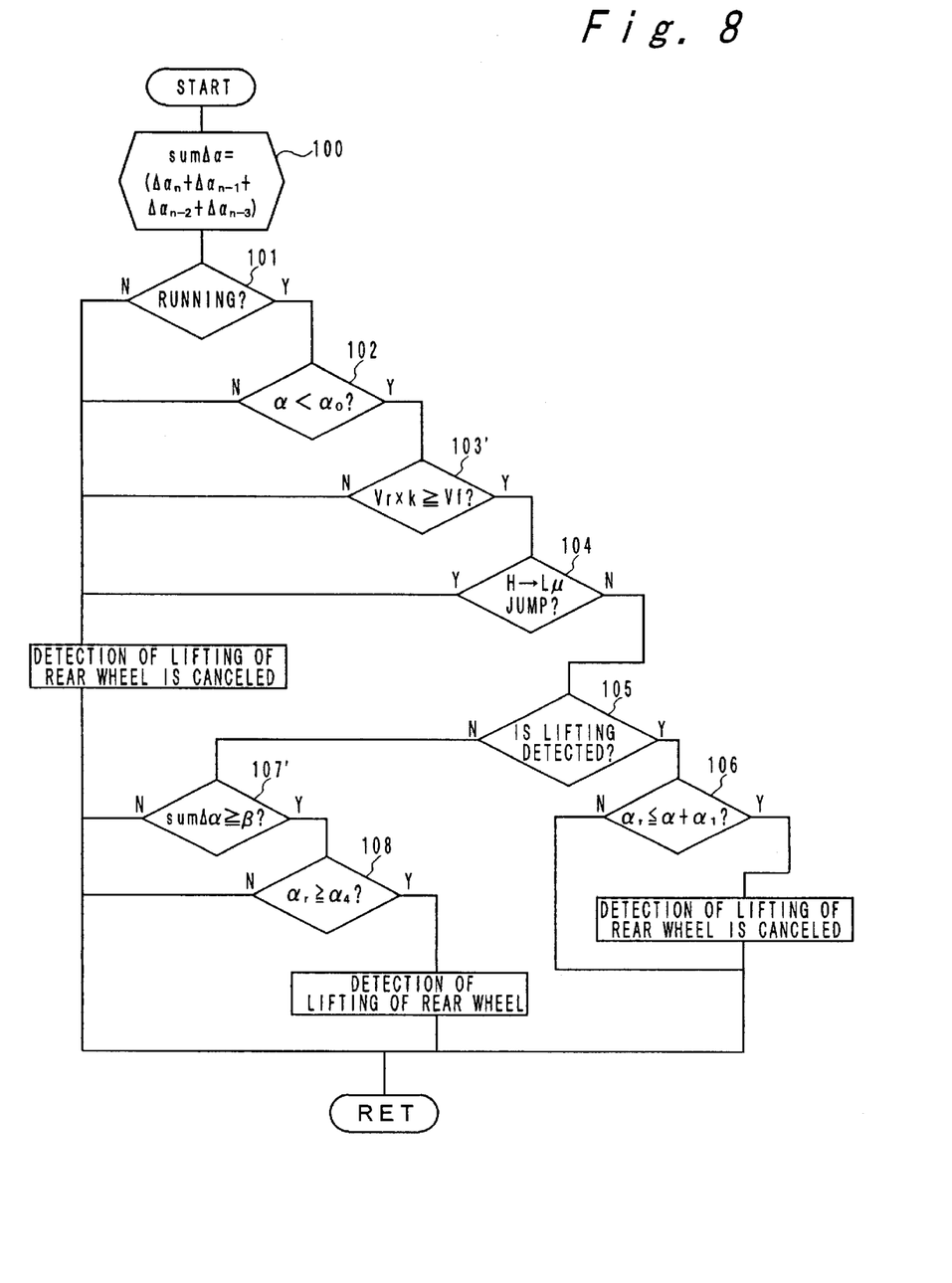
FIG. 8 is another flowchart for detecting lifting of a rear wheel.

The detection of lifting of the rear wheel is also conducted here by utilizing the function of the electronic control unit (ECU) 500 which is originally equipped with the two-wheeled vehicle. FIG. 8 is another example of the flowchart. The main point of difference of the flowchart of FIG. 8 from FIG. 7 is that the degree of deceleration of the estimated vehicle deceleration is watched as an average value of the changed amounts of the vehicle deceleration, and the timer T is eliminated. However, since most parts are same as the flowchart of FIG. 7, like parts are represented by like reference numerals and description thereof is either completely omitted or simplified.

In this flow, first, in Step 100, the estimated vehicle deceleration $\alpha$ is continuously monitored four cycles by setting one cycle to 10 ms and the sum $\Delta\alpha$ of the changed amounts $\Delta\alpha n$, $\Delta\alpha n-1$, $\Delta\alpha n-2$ and $\Delta\alpha n-3$ is obtained at every cycle. Thereafter, the process proceeds to Step 101 where it is judged whether or not the vehicle is in a running condition, Step 102 where the level of the estimated vehicle deceleration or is confirmed and Step 103' where the wheel speed of the rear wheel is compared with that of the front wheel. In Step 103', taking into account the fact that this flow No. 2 is easier for detection than the flow No. 1, it is preferred that a smaller coefficient (k) than 1 (for example, 0.95) is multiplied to the wheel speed Vr of the rear wheel in order to prevent an erroneous detection. Of course, a larger coefficient than 1 may be multiplied to the wheel speed Vf of the front wheel.

After a judgment is made for the purpose of prevention of an erroneous detection attributable to H-L$\mu$ jump in the next Step 104, the process proceeds to Step 105 which is a step for detecting lifting of the rear wheel. If the judgment is affirmative in Step 105, the process proceeds to Step 106 where it is judged whether or not the wheel acceleration and deceleration $\alpha_r$ of the rear wheel R is recovered. In contrast, if the judgment is negative in Step 105, the process proceeds to Step 107'.

In Step 107', it is judged whether or not the sum $\Delta\alpha$ of the changed amounts of the estimated vehicle deceleration a for four-cycle portion is a predetermined value $\beta$ (for example, 0.04 g) or larger. If the judgment is affirmative, process proceeds to Step 108 where it is confirmed that the vehicle acceleration $\alpha_r$ of the rear wheel R is flat and lifting of the rear wheel is detected. In contrast, if the sum $\Delta\alpha$ is smaller than the predetermined value $\beta$, the detection of lifting of the rear wheel is canceled. In this way, since the changed amounts of the estimated vehicle deceleration $\alpha$ is monitored as an average value of the four-cycle portion in Step 107', lifting of the rear wheel can effectively be detected even in the case where there exists some fluctuation in vehicle deceleration signal (temporary changes occurred attributable to slight deceleration of the rear wheel, which is lifted in air, caused by resistance of the driving system).

What is claimed is:

1. A method for detecting lifting of a rear wheel of a two-wheeled vehicle which is equipped with an antilock brake controlling unit, comprising:

generating an estimated vehicle speed by selecting the larger one of wheel speed of a front wheel and a rear wheel at the time of detecting lifting of the rear wheel from a ground surface; and paying attention to an estimated vehicle deceleration which is computed based on said estimated vehicle speed and judging that lifting of the rear wheel has occurred when a degree of lowering of said estimated vehicle deceleration is a predetermined value or larger;

wherein the degree of lowering of said estimated vehicle deceleration is judged to be a predetermined value or larger when one of the following items (A) and (B) is judged to be present;

(A) a first condition is satisfied in which the difference between a time estimated vehicle deceleration and a preceding time estimated vehicle deceleration is larger than a predetermined value, and in addition a second condition is satisfied in which the first condition is fulfilled for a predetermined time or longer;

(B) a third condition is satisfied in which a sum of changed amounts of the estimated vehicle deceleration for several-cycle portions is larger than a predetermined value.

2. A method for detecting lifting of a rear wheel according to claim 1, wherein it is judged that lifting of the rear wheel has occurred when a condition is satisfied in which the degree of lowering of said estimated vehicle deceleration is a predetermined value or larger and in addition, when at least one of the following items (o), (p), (q), (r) and (s) is employed as a condition and the employed condition is satisfied;

(o). a condition for preventing an erroneous detection resulting from a jump in the slip friction coefficient;

(p). a condition that the two-wheeled vehicle is running;

(q). a condition that said estimated vehicle deceleration is larger than a predetermined value;

(r). a condition that a wheel speed of the rear wheel is larger than a wheel speed of the front wheel;

(s). a condition that a rear wheel acceleration is larger than a predetermined value.

3. A method for controlling a brake of a two-wheeled vehicle which is equipped with an antilock brake controlling unit, comprising:

generating an estimated vehicle speed by selecting the larger one of wheel speed of a front wheel and a rear wheel;

paying attention to an estimated vehicle deceleration which is computed based on said estimated vehicle speed and judging that lifting of the rear wheel has occurred when a degree of lowering of said estimated vehicle deceleration is larger than a predetermined value; and making said estimated vehicle speed in compliance with said wheel speed of the front wheel in accordance with a detection: wherein the degree of lowering of said estimated vehicle deceleration is judged to be a predetermined value or larger when one of the following items (A) and (B) is judged to be present;

(A) a first condition is satisfied in which the difference between a time estimated vehicle deceleration and a preceding time estimated vehicle deceleration is larger than a predetermined value, and in addition a second condition is satisfied in which the first condition is fulfilled for a predetermined time or longer;

(B) a third condition is satisfied in which a sum of changed amounts of the estimated vehicle deceleration for several-cycle portions is larger than a predetermined value.

4. A method for controlling a brake of a two-wheeled vehicle according to claim 3, wherein it is judged that lifting of the rear wheel has occurred when a condition is satisfied in which the degree of lowering of said estimated vehicle deceleration is a predetermined value or larger and in addition, when at least one of the following items (o), (p), (q), (r) and (s) is employed as a condition and the employed condition is satisfied;

(o). a condition for preventing an erroneous detection resulting from a jump in the slip friction coefficient;

(p). a condition that the two-wheeled vehicle is running;

(q). a condition that said estimated vehicle deceleration is larger than a predetermined value;

(r). a condition that a wheel speed of the rear wheel is larger than a wheel speed of the front wheel;

(s). a condition that a rear wheel acceleration is larger than a predetermined value.

5. A method for controlling a brake of a two-wheeled vehicle according to claim 3 or 4, wherein when lifting of the rear wheel is detected, said estimated vehicle speed is computed based on a lowest wheel speed.

6. A method for controlling a brake of a two-wheeled vehicle according to one of the claims 3 to 5, wherein when lifting of the rear wheel is detected, a deceleration gradient of said estimated vehicle speed used for said antilock brake controlling unit is limited to be small.

* * * * *